J. E. GLEASON, A. L. STEWART AND E. C. HEAD.
GEAR CUTTING MACHINE.
APPLICATION FILED JUNE 17, 1919.

1,344,879.

Patented June 29, 1920.

INVENTORS
James E. Gleason, Arthur L. Stewart
Ernest C. Head
BY
their ATTORNEYS

J. E. GLEASON, A. L. STEWART AND E. C. HEAD.
GEAR CUTTING MACHINE.
APPLICATION FILED JUNE 17, 1919.

1,344,879.

Patented June 29, 1920.
7 SHEETS—SHEET 2.

INVENTORS
James E. Gleason, Arthur L. Stewart
BY  Ernest C. Head
their ATTORNEYS J. E. GLEASON, A. L. STEWART AND E. C. HEAD.
GEAR CUTTING MACHINE.
APPLICATION FILED JUNE 17, 1919.

1,344,879.

Patented June 29, 1920.
7 SHEETS—SHEET 3.

INVENTORS
James E. Gleason, Arthur L. Stewart
BY    Ernest C. Head
their ATTORNEYS

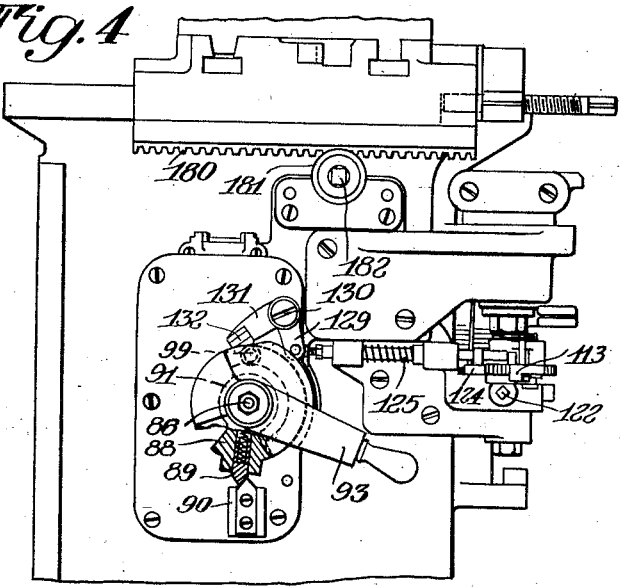

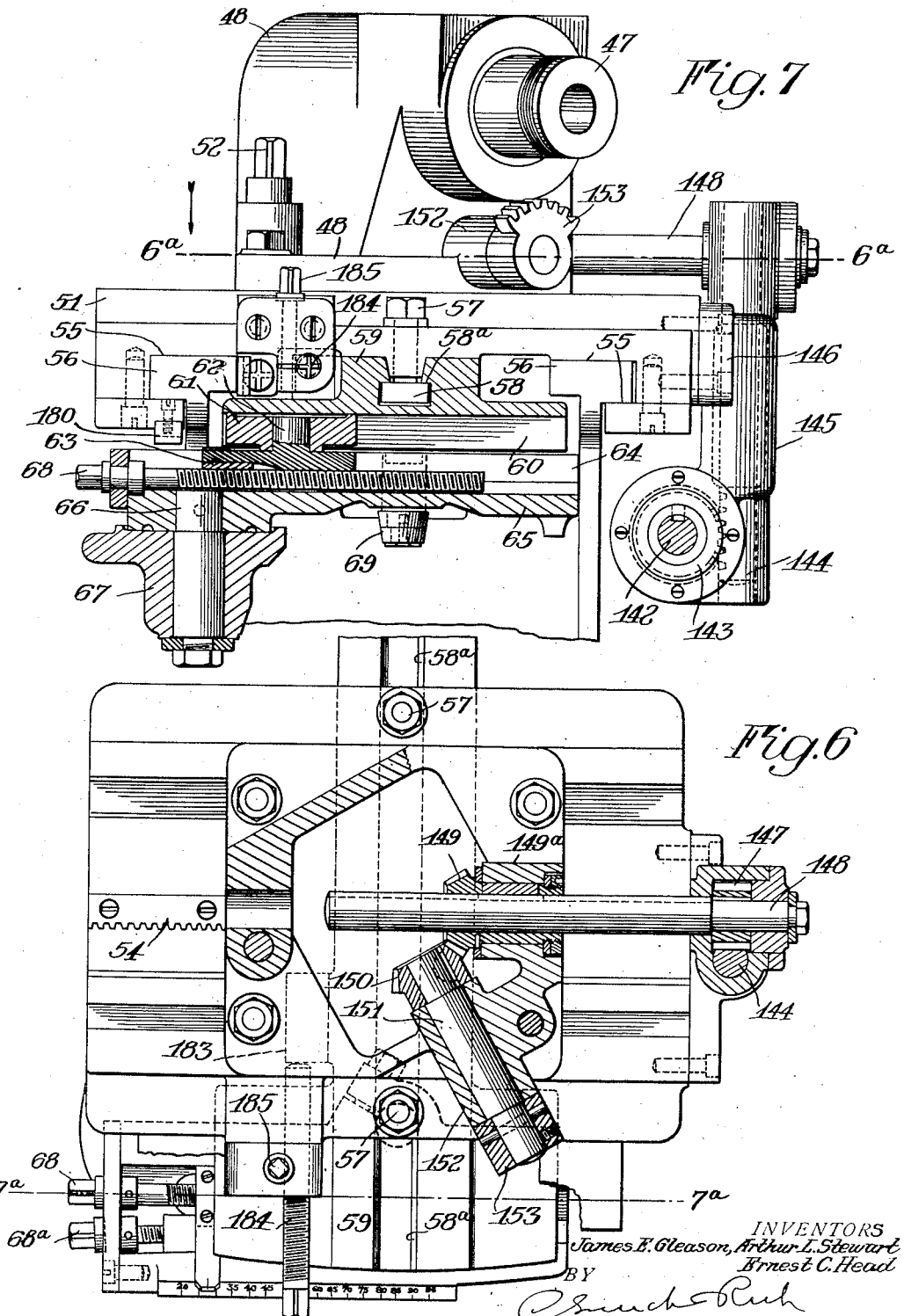

J. E. GLEASON, A. L. STEWART AND E. C. HEAD.
GEAR CUTTING MACHINE.
APPLICATION FILED JUNE 17, 1919.
1,344,879.
Patented June 29, 1920.
7 SHEETS—SHEET 6.
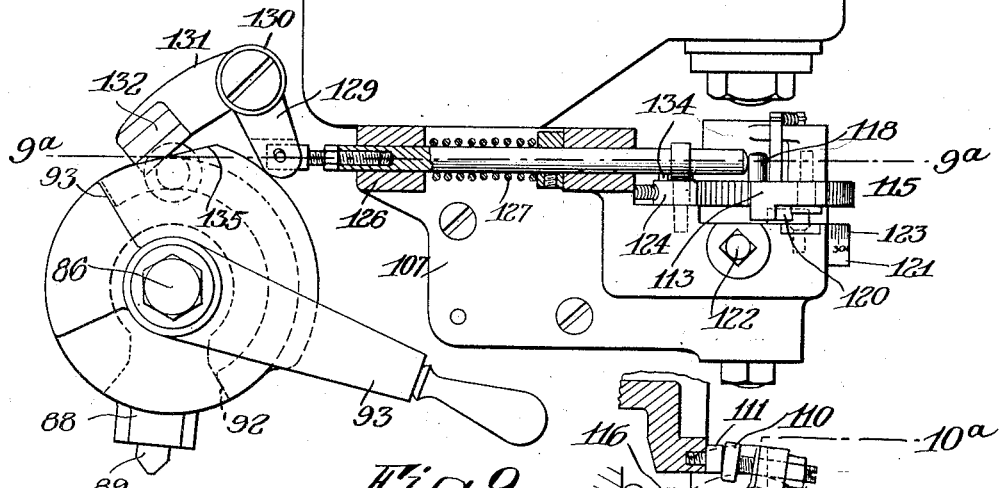
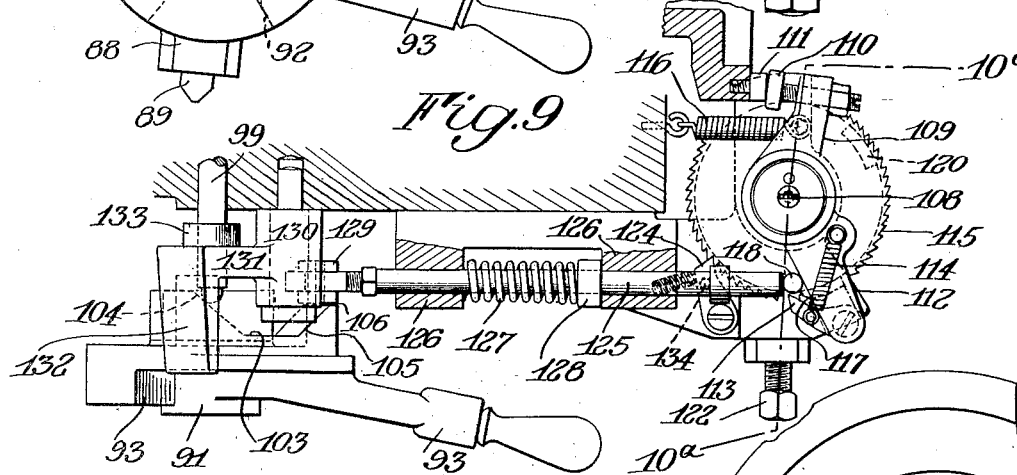
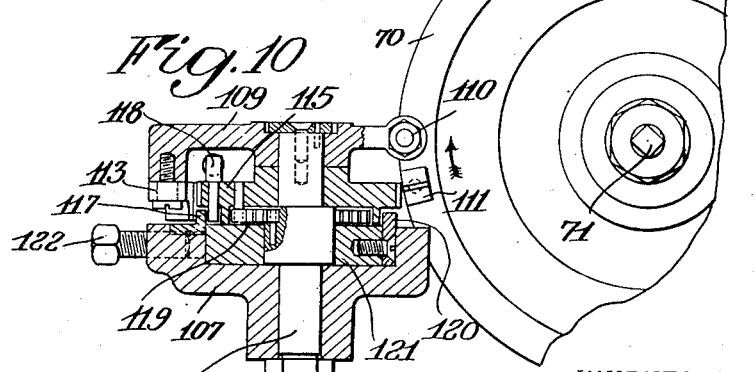
INVENTORS
James E. Gleason, Arthur L. Stewart
BY Ernest C. Head
their ATTORNEYS J. E. GLEASON, A. L. STEWART AND E. C. HEAD.
GEAR CUTTING MACHINE.
APPLICATION FILED JUNE 17, 1919.
1,344,879.
Patented June 29, 1920.
7 SHEETS—SHEET 7.
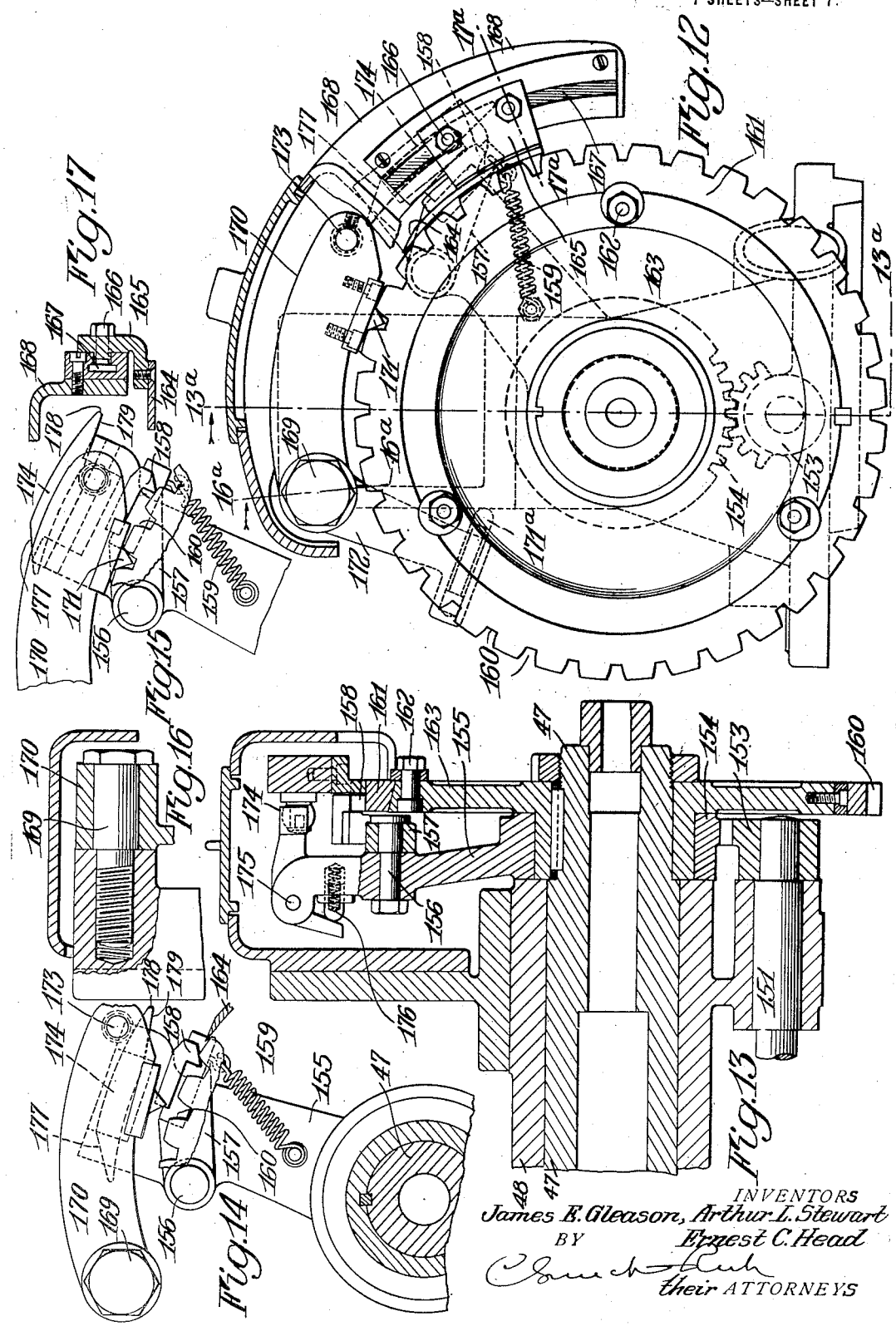
INVENTORS
James E. Gleason, Arthur L. Stewart
BY Ernest C. Head
their ATTORNEYS

UNITED STATES PATENT OFFICE.

JAMES E. GLEASON, ARTHUR L. STEWART, AND ERNEST C. HEAD, OF ROCHESTER, NEW YORK, ASSIGNORS TO THE GLEASON WORKS, OF ROCHESTER, NEW YORK, A CORPORATION OF NEW YORK.

GEAR-CUTTING MACHINE.

1,344,879.   Specification of Letters Patent.   Patented June 29, 1920.

Application filed June 17, 1919. Serial No. 304,883.

*To all whom it may concern:*

Be it known that we, JAMES E. GLEASON, ARTHUR L. STEWART, and ERNEST C. HEAD, of Rochester, in the county of Monroe and State of New York, have invented certain new and useful Improvements in Gear-Cutting Machines; and we do hereby declare the following to be a full, clear, and exact description of the same, reference being had to the accompanying drawings, forming a part of this specification, and to the reference-numerals marked thereon.

This invention relates to gear cutting machines and, more particularly, to machines employing a disk milling cutter, together with means for effecting relative feeding movements between the cutter and a plurality of blanks, and for indexing the blanks between feeding movements.

One object of the invention is the provision of a machine of the above character, employing a disk milling cutter, and a plurality of blank supports coöperating therewith by relative feeding movements substantially radially of the cutter for producing a high capacity of output.

Another object is the provision of a machine such as described having a plurality of blank supports arranged at intervals about a common cutter for coöperation therewith in coördination with each other, for effecting a high output capacity with relatively small power consumption.

A further object is to provide a machine of the above description having convenient and efficient means for controlling the operation of the actuating mechanism for the blanks, including means for automatically disconnecting the actuating mechanism upon completion of a gear.

Still a further object is the provision of convenient and efficient means for supporting and manipulating the blank. To these and other ends the invention consists in certain improvements and combinations of parts all as will be hereinafter more fully described, the novel features being pointed out in the claims at the end of the specification.

In the drawings:

Fig. 4 is a side elevation of one of the blank spindle supporting and operating means.

Fig. 5 is a section on the line 5ª—5ª of Fig. 3 showing the clutch mechanism for controlling the actuation of the blank spindle.

Fig. 6 is a section on the line 6ª—6ª of Fig. 7 showing parts of the spindle supporting and actuating means.

Fig. 7 is a section on the line 7ª—7ª of Fig. 6.

Fig. 8 is a side elevation, enlarged, of the parts for controlling the actuation of the spindle.

Fig. 9 is a section on the line 9ª—9ª of Fig. 8.

Fig. 10 is a section on the line 10ª—10ª of Fig. 9.

Fig. 11 is a section on the line 11ª—11ª of Fig. 2, showing a part of the actuating means for the indexing mechanism.

Fig. 12 is a face view of the indexing wheel and coöperating parts.

Fig. 13 is a section on the line 13ª—13ª of Fig. 12.

Figs. 14 and 15 are fragmentary elevations similar to Fig. 12, but showing the parts in different positions.

Fig. 16 is a section on the line 16ª—16ª of Fig. 12 and

Fig. 17 is a section on the line 17ª—17ª of Fig. 12.

Figure 1:
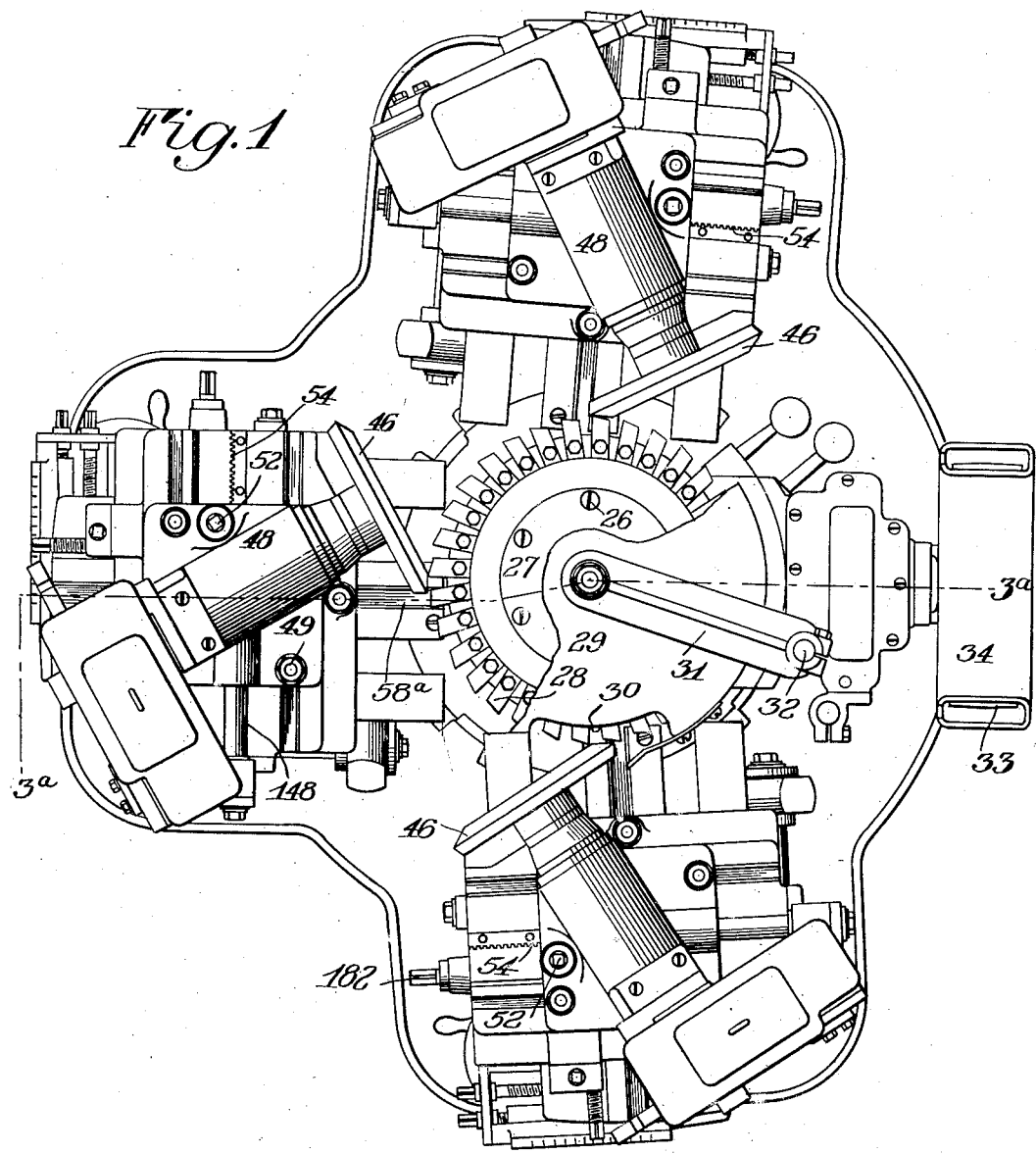
Figure 1 is a top plan view of the machine.

The embodiment of the invention at present preferred, as best illustrating the principles involved and herein described and shown, is intended primarily for "roughing out" gear blanks, as a preliminary to the finishing operation, but many of the features are applicable as well to other gear cutting machines. In general, this machine comprises, preferably, a centrally arranged disk cutter about which are disposed at intervals a plurality of supports each carrying a gear blank in position to be operated upon by the cutter, and comprising feeding and indexing means for the blank, the supports being so disposed about the cutter, as will later appear, as to produce the least strain upon the machine and consume a minimum of power. There is indicated at 20 a unitary support or frame for the machine, preferably formed adjacent its center with a bearing 21, Fig. 3, in which is rotatably supported a vertical shaft 22, carrying at its upper end a flange 23 having a bearing surface 24 which with locking nuts 25 at the lower end of the spindle serve to prevent longitudinal movement of the latter in its bearing. Fixed to the flange, preferably by means of screws 26, is a disk 27 carrying a plurality of cutting tools 28 extending substantially radially of the disk and spaced from each other about the periphery thereof. A guard 29 is provided for the cutter having openings 30 therein for admitting the blanks, the guard being supported by an arm 31 adjustably carried on a spindle 32 projecting upwardly from the frame of the machine.

The means for driving the cutter comprises, preferably, a pulley 33 in a guard 34 and fixed on a shaft 35 rotatable in bearings 36 on the frame of the machine. Fixed on the shaft is a pinion 37 meshing with a gear 38 fixed on a shaft 39 rotatable in bearings 40 on the frame, and having fixed on its inner end a pinion 41 meshing with a gear 42 secured, as by means of screws 43, on the under side of the flange of the cutter shaft. At 44 is shown an oil pump driven by a chain 45 from the shaft 35, which however, forms no part of the present invention.

The blanks are indicated at 46, Fig. 1, being preferably secured in any suitable manner on the inner ends of spindles 47 journaled in bearing heads 48, and as the means for supporting and operating each of the blanks is the same, a description of one will apply to all. Bearing head 48 is secured by means of bolts 49 engaging with T-slots 50 formed in the upper surface of a carriage 51 on which the head rests. A means is provided for adjusting the head on the carriage in a direction transversely of the feeding movement and substantially tangential to the cutter, comprising a spindle 52 on the carriage, Fig. 1, carrying at its lower end a pinion 53 and meshing with a rack 54 fixed to the head, bolts 49 being loosened for the purpose of operating the adjustment, after which they are tightened to clamp the head to the carriage. The carriage is formed with bearing surfaces 55 coöperating with guideways 56 on the frame of the machine extending in a direction substantially radial of the cutter. The carriage is provided with bolts 57 the lower ends of which engage a plate 58 sliding in a T-slot 58ª in a slide 59 which is supported by the plate 58 and adapted to be clamped by means of the bolts to the carriage. Slide 59 is formed with a transverse slot 60 in which slides a block 61 pivotally carried on a pin 62 projecting upwardly from a second block 63 slidable in a slot 64 formed in an arm 65 pivotally supported on a spindle 66 carried by a portion 67 of the machine frame. Block 63 is adjustable longitudinally of its slots to vary the extent of feeding movement by means of a spindle 68 in threaded engagement therewith, a take-up wedge of the usual form being provided and operated by a spindle 68ª.

Figure 3:
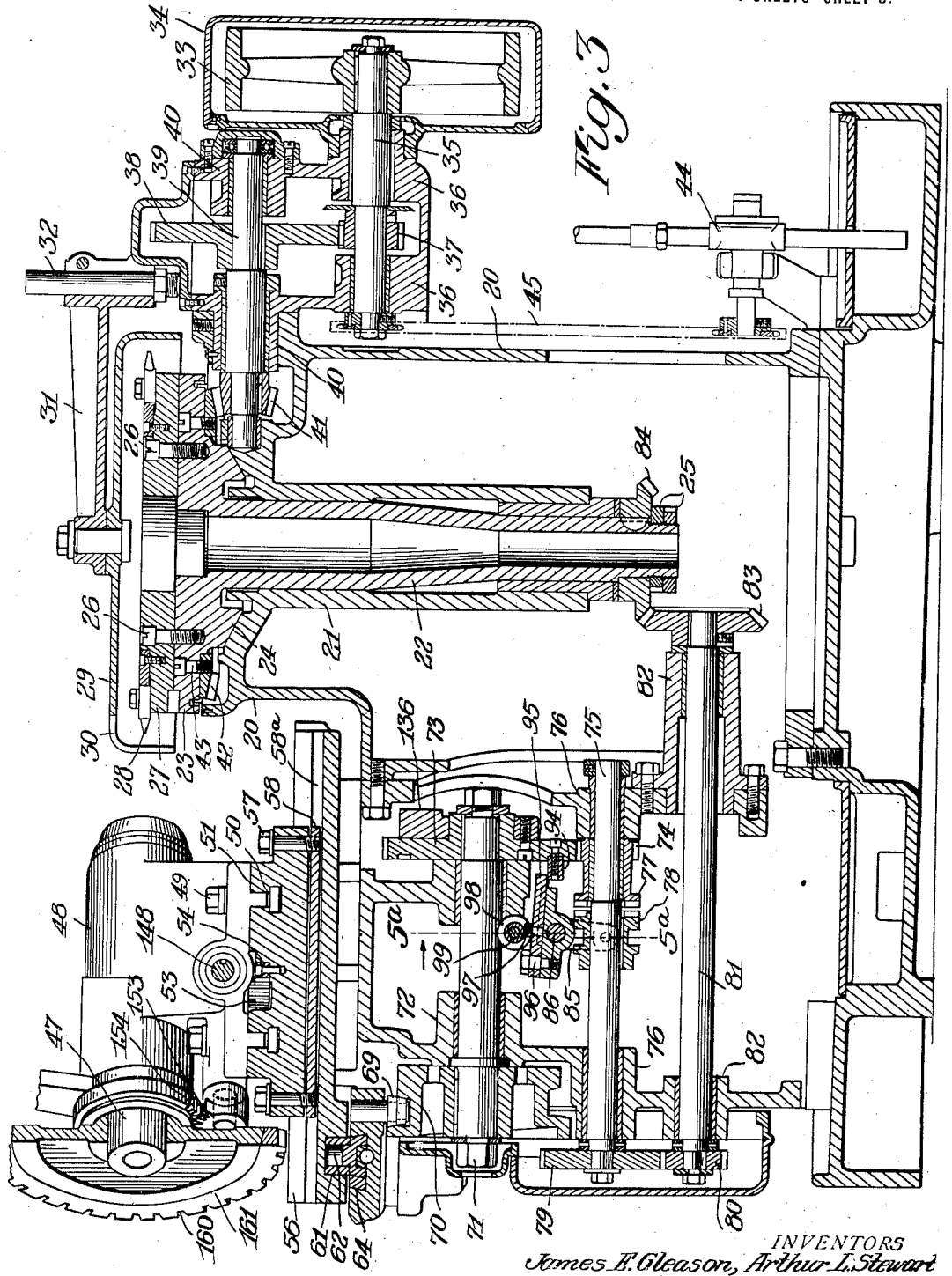
Fig. 3 is a sectional elevation on the line 3ª—3ª of Fig. 1.

Means for feeding the blank toward and from the cutter by reciprocating arm 65 comprises, preferably a roller 69 on the arm and engaging in a slot in the periphery of a feed cam 70, Fig. 3, fixed on a shaft 71 rotatable in bearings 72 on the frame, and having fixed on its opposite end a gear 73 meshing with a pinion 74 rotatable on a shaft 75 journaled in bearings 76 on the frame. Gear 74 is provided with a clutch face 77 with which is adapted to be engaged a coöperating clutch face on a sleeve 78 splined to the shaft, the sleeve being shiftable on the shaft, by means hereinafter described, into and out of engagement with the clutch face 77 for locking the gear 74 to and releasing it from the shaft, thereby connecting or disconnecting the driving mechanism from the actuating means for the spindle.

The driving mechanism for the spindle actuating clutch 77—78 comprises a gear 79 fixed on shaft 75 and meshing with a gear 80 on a shaft 81 rotating in bearings 82 on the frame and having fixed on its opposite end a gear 83 meshing with a gear 84 keyed to the cutter shaft. The latter is actuated by the means described above from the pulley 33 and is connected by the above described train of gearing with each of the blank spindles for actuating the latter to coöperate with the cutter. Gears 79 and 80 constitute "change gears" by means of which the rate of feed of the blank may be varied as desired with relation to the cutting speed of the cutter.

Clutch part 78 is actuated by means of a yoke 85 having thereon rollers engaging a groove in the said part, the yoke being keyed on a shaft 86, Fig. 5, rotatably supported in bearings 87 on the frame and projecting at one end outside the latter where the shaft has fixed thereon an arm 88 carrying a spring actuated latch 89 adapted to be swung to opposite sides of a coöperating lug 90, Fig. 4, these parts being so arranged that when the latch is on the left of the lug the clutch parts are in engagement for actuating the spindle and when the latch is on the opposite side of the lug the clutch is held disengaged. The means for swinging arm 88 to these positions comprises a hub 91 rotatable on shaft 86 and provided with abutments 92 and 93 on opposite sides thereof, Fig. 8, which are adapted to be brought into actuating engagement with arm 88 by means of a handle 93 on the hub.

Means are provided for automatically disengaging the clutch comprising a lug 94, Fig. 5, on gear 73 which is adapted during the rotation of the gear to engage a tripping member 95 pivotally supported on a pin 96 on yoke 85, and carrying a lug 97 engaged by a grooved collar 98 fixed on a spindle 99 slidable in bearings 100 in the frame, a spring 101 between the frame and the collar serving to hold the spindle normally projected toward the hub 91 which it engages by a contact point 102. Spindle 99 may be moved toward the right as seen in Fig. 5 for the purpose of turning the tripping part 95 on its pivot to carry it outside the path of movement of lug 94, thus rendering it inactive.

The means for sliding spindle 99 and controlling the automatic tripping device comprises a cam surface on hub 91 formed with a depression 103 on the opposite sides of which are inclined portions 104 and 105, the latter joining a continuous projection 106, Fig. 9. These parts are so arranged that when handle 93 is rotated in a clockwise direction to the position shown in Figs. 8 and 9 to engage the clutch, inclined portion 104 of the cam moves spindle 99 inwardly and renders the tripping device inactive, the spindle being held in such position against the pressure of its spring by a detaining arm 131 of a stop mechanism presently to be described, while the blank is successively fed and indexed until completed. Handle 93 may be slightly rotated from this position in a counter-clockwise direction until a cam portion 135 thereon engages and raises detent arm 131 and spindle 99 comes into depression 103 of the cam, so that the tripping device is set to disengage the clutch and stop the operation upon the next rotation of gear 73. Further rotation of handle 93 in this direction brings inclined portion 105 and projection 106 of the cam into engagement with the spindle 99 to hold the latter and the tripping device inactive for continuous operation of the blank. Further counter-clockwise movement of the handle disengages the clutch, as described.

For automatically disconnecting the actuating means from the spindle after the lapse of an adjustably timed interval, as upon the completion of a gear, there is provided a stop mechanism comprising a bracket 107, Figs. 8 and 9, supporting a spindle 108 on which is rotatably carried a lever having an arm 109 on which is an adjustable contact 110 adapted to be engaged by a lug 111 on feed cam 70 during each revolution of the latter. The lever has also an opposite arm 112 on which is rotatably carried a pawl 113 moved by spring 114 into engagement with a ratchet wheel 115 rotatably carried on spindle 108. Contact 110 is held in engagement with the feed cam by means of a spring 116, so that once in each revolution of the cam, arm 109 is oscillated and pawl 113 moves the ratchet one tooth, a stop being provided for the pawl at 117 for holding the latter out of engagement with the ratchet on its return to initial position. Ratchet 115 carries a pin 118 projecting on both sides of the wheel and the latter is rotated by means of a coiled spring 119, Fig. 10, connected with the ratchet and with spindle 108, to carry pin 118 into engagement at its lower end with a stop 120 on a disk 121 adjustably rotatable on spindle 108 and secured in adjusted position by a set screw 122, disk 121 being provided with graduations 123, Fig. 8, indicating the position in which stop 120 is to be adjusted for disconnecting the spindle gearing upon completion of the desired number of teeth. For detaining the ratchet wheel, as it is advanced step by step by pawl 113, there is provided a pivoted detent 124 spring actuated into engagement with the ratchet.

Rotation of the ratchet wheel 115 eventually brings pin 118 into engagement with one end of a spindle 125 longitudinally slidable in bearings 126 on the bracket, the spindle being urged toward the right, Fig. 9, into position to engage with the pin by means of a spring 127 between the bracket and the collar 128 fixed on the spindle. At its opposite end the spindle is adjustably and pivotally connected with one arm 129 of a bell-crank lever 130 pivotally carried on the frame and having an arm 131 provided with a shoe 132 projecting above hub 91 and the cam surfaces thereon. Arm 131, in its lower position, is adapted to engage a shoulder 133 on spindle 99 when the latter is in inoperative position, as shown in Figs. 8 and 9, and to retain it in such position, spindle 125 being actuated upon completion of a gear by pin 118 of the ratchet wheel, to raise arm 131 and allow spindle 99 to be moved to active position by its spring, the latter being sufficiently strong to cause the spindle to turn hub 91 by engagement with the inclined cam portion 104 thereof, as shown in Fig. 9, so that the spindle enters the depression 103 and the clutch parts are automatically disengaged, by the means described, upon the following rotation of the gear 73. In this position of spindle 99, shoulder 133 thereon holds arm 131 in raised position, thereby retracting spindle 125 from engagement with the pin on the ratchet wheel. The spindle carries a downwardly projecting pin 134 adapted in the retracted position of the spindle to move pawl 124 out of engagement with the ratchet wheel, which is thereupon returned by spring 119 to initial position, ready for a subsequent operation after spindle 99 has been returned to inoperative position by means of cam surface 104, the spindle being again retained in such position by arm 131. Hub 91 is provided with a cam surface 135 by means of which arm 131 may be raised at any time during the operation of the machine for the purpose of releasing spindle 99 and setting the tripping device in operating position.

Figure 2:
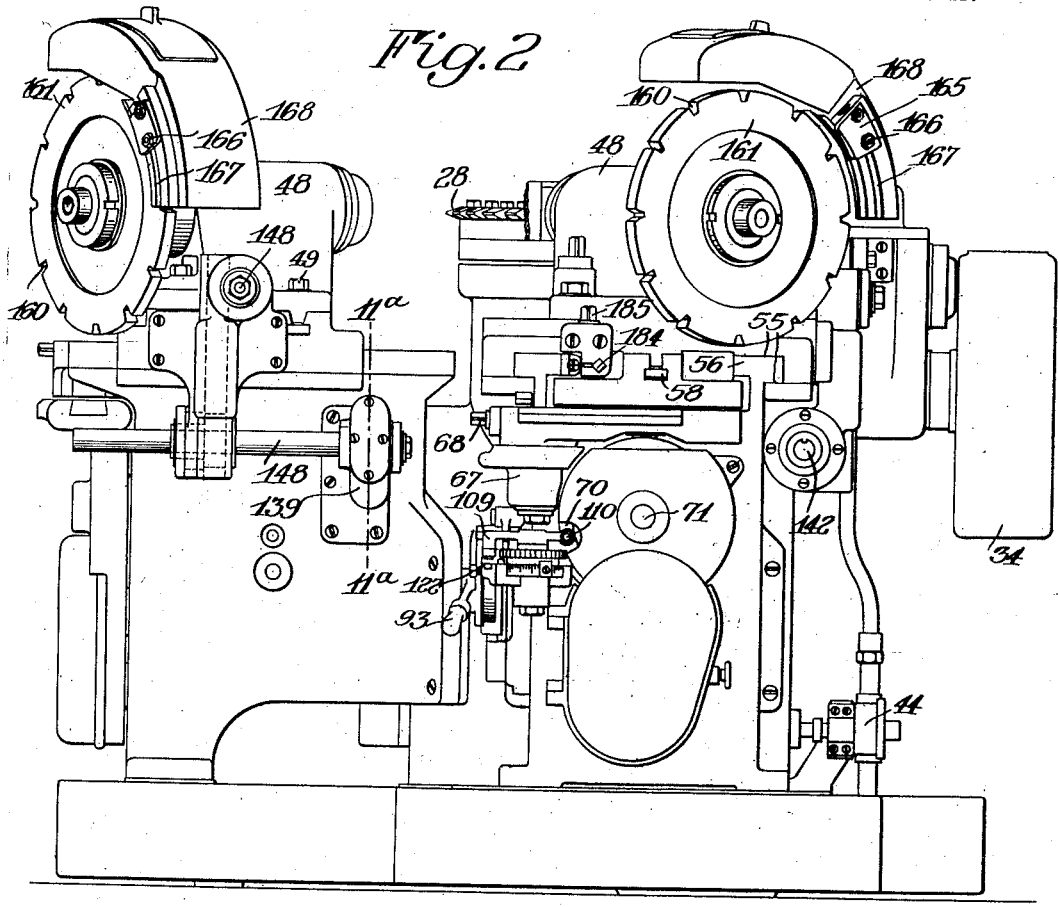
Fig. 2 is a side elevation of the same.

The indexing mechanism comprises, preferably, a cam 136, Fig. 3, with which are engaged a pair of followers 137, Fig. 11, on spindles 138 longitudinally slidable in a bracket 139 secured on the frame of the machine, Fig. 2, the spindles being formed with rack teeth 140 for engagement with opposite sides of a pinion 141 fixed on a shaft 142 rotatably supported in the bracket, the shaft having splined thereon a pinion 143, Fig. 7, meshing with rack 144 which, together with the pinion, is supported in a casing 145 fixed at 146 on the spindle carriage. The rack meshes at its upper end, Fig. 6, with a pinion 147 fixed on a shaft 148 rotatably supported in casing 145 and supported at its other end by a gear 149 splined thereon and rotatable in a bearing 149$^a$ of the spindle head. Gear 149 meshes with gear 150 fixed on a spindle 151 rotatable in a bearing 152 on the spindle head, it being apparent that these connections are of a flexible construction permitting a feeding movement of the spindle and also a transverse adjustment thereof.

Fixed on spindle 151 is a gear sector 153, Figs. 6 and 12, meshing with a sector 154 rotatably carried on the spindle and having thereon an upwardly extending arm 155 carrying a spindle 156 on which is rotatably supported an arm 157 having fixed thereon a pawl or dog 158 which, by means of a spring 159 is urged into engagement with notches 160 of an index wheel 161 detachably fixed by means of bolts 162, on a hub 163 keyed on the spindle.

The pawl is so shaped as to engage and rotate the wheel when moved in a counter-clockwise direction, but to pass idly over the wheel in the opposite direction, in which direction it eventually rides up on a curved guide 164 carried by a plate 165 having bolts 166 engaging a T-slot 167 in a guard 168 fixed on the frame. As shown in Fig. 12, slot 167 is curved so as to be concentric with the index wheel, and guide 164 may be adjusted peripherally of the wheel to vary the point at which the pawl engages the index wheel at the beginning of its counter-clockwise, or active stroke. The index wheel, being detachable, may be replaced by other wheels having different numbers of teeth, while the adjustable guide determines by its position the number of teeth through which the wheel is rotated by the pawl at each stroke of the latter, these means combined affording in a simple and convenient manner a large number of possible variations in the number and pitch of teeth cut in the blank.

A detent for the index wheel is provided comprising a spindle 169 on the frame, pivotally supporting an arm 170, Fig. 12, having fixed thereon a detent 171 urged into engagement with the notches of the index wheel by a spring device 171$^a$ on an extension 172 of arm 170 and serving to retain the wheel in position. A roller 173 on the arm lies in the path of movement of a shuttle 174 pivoted at 175 on the arm 155 and having a spring device 176 urging the shuttle toward its lowermost position. The latter is formed at one end with an inclined portion 177 adapted, in the counter-clockwise or active movement of arm 155 and pawl 158, to engage under roller 73 to raise arm 170 and detent 171 to release the index wheel before pawl 158 reaches the end of guide 154 and engages the wheel, the detent being held out of engagement until the pawl reaches the end of its active stroke when roller 173 drops off the end of shuttle 174 and permits the detent to engage the index wheel. On the return stroke of the shuttle an inclined portion 179 thereof rides up over roller 173 leaving the detent in engagement with the wheel. The index wheel is thus positively moved and then positively detained in its position during the idle stroke of the pawl.

In addition to the automatic feeding movement of the spindle toward and from the cutter a means is provided for manually moving the spindle away from the cutter for the purpose of easier access to the blank, as when inserting or removing the latter, comprising a rack 180 on the carriage, Figs. 4 and 7, with which engages a pinion 181 on a spindle 182 on the frame manually rotatable to shift the carriage, the clamping bolts 57 being first released to disconnect the carriage from the automatic slide 59. The carriage may then be moved independently of the automatic means, and in order to facilitate the return of the carriage to its adjusted position with relation to the automatic means there is provided on the slide a lug 183, Fig. 6, with which is adapted to engage an adjustable threaded spindle 184 carried by the carriage and adapted to be clamped in position by a screw 185. When spindle 184 has been brought into engagement with the lug, the carriage is again clamped in position by the bolts 57. The several arrangements described for adjusting the position of the spindles toward and from the cutter and in a transverse direction adapt the machine to accommodate gear blanks of a considerable range of dimensions.

The work spindles are so disposed about the periphery of the cutter as to bring the blanks into engagement with the latter at points on its periphery which are spaced from each other at distances corresponding to an integral number of spaces between the tools of the cutter, plus a fraction of one of such spaces, the result being that but one of the tools begins a cutting stroke at one time, and, in fact, but one of the tools is cutting at one time, except in the case of gears with wide faces, in which case two tools of the cutter may cut simultaneously, but their cutting strokes are begun singly and successively. This arrangement affords the important advantage of greatly reducing the stresses on the machine, which are greatest at the beginning of a cutting stroke, and consequently the power required for operating the machine is also much reduced.

The arrangement and operation of the cutter and spindles is such that the blanks are fed radially of the cutter, as made practicable by the relatively large size of the latter, and the advantage is thereby obtained of increasing the speed of cutting while reducing the extent of the feeding movement. The cutter is of sufficient size to facilitate simultaneous cutting operations on a plurality of blanks, which with the features described above adapt the machine for a high capacity of output.

In the operation of the machine, as indicated by the structure described, the spindle carriages may be released and retracted by manual means from the cutter for convenience in positioning the blank on the spindle, after which the carriage is returned to adjusted position and clamped to the automatic feeding means, and the controlling handle 93 is moved to engage the clutch parts 77 and 78 so that, by the means described, the spindle is automatically fed toward and from the cutter and alternately indexed through the space of one tooth, the indexing mechanism having been adjusted to correspond with the desired number of teeth and pitch of the gear. The timing mechanism for throwing out the spindle actuating means upon completion of a gear is set in accordance with the number of teeth to be cut and operates upon completion of the work on any one spindle to disconnect that spindle for the substitution of a new blank. The spindles, while conveniently controllable independent of each other, are nevertheless coördinated as described above, so that the tools of the cutter begin operation singly and successively, with but a limited minimum number of tools in engagement with the work at any one time, thereby reducing the strain on the machine especially in cutting blanks of hard metal, and reducing the power consumption of the machine. The operation of any one of the spindles may be manually discontinued at any time by rotation of the handle 93 so as to release the spindle 99 and set the tripping device in active position, while the controlling mechanism may be conveniently manipulated to start the operation of the spindle and to set the parts in operative position for automatically stopping the same upon completion of the work.

We claim as our invention:

1. In a gear cutting machine, the combination of a rotary cutter provided with a plurality of tools spaced about its periphery, a plurality of blank supports disposed in spaced relation about the cutter, said tools and supports being relatively spaced and arranged to bring a limited minimum number of the tools into cutting engagement with the blanks at a time, feeding means for effecting relative movements of the blank supports and cutter, and means for indexing the blank supports between feeding movements.

2. In a gear cutting machine, the combination of a rotary cutter provided with a plurality of tools spaced about its periphery, a plurality of blank supports disposed about the disk at intervals selected with relation to the spacing of the tools to bring a limited minimum number of the tools into cutting engagement with the blanks at a time, feeding means for effecting relative movements of the blank supports and cutter, and means for indexing the blank supports between feeding movements.

3. In a gear cutting machine, the combination of a cutter disk having a plurality of tools spaced about its periphery, means for rotating the disk, a plurality of blank spindles disposed in spaced relation about the cutter disk said tools and spindles being relatively spaced and arranged for beginning the cutting strokes of the tools one at a time, feeding means for effecting relative movements of the spindles and cutter disk, and means for indexing the spindles between feeding movements.

4. In a gear cutting machine, the combination of a rotary cutter, a plurality of blank supports disposed at intervals about the cutter, said cutter having a large diameter relative to the blanks to be cut to adapt it for coöperation with all of said blank supports, feeding means for effecting relative movements of the blank supports and cutter substantially radially of the latter, and means for indexing the blank supports between feeding movements.

5. In a gear cutting machine, the combination of a rotary cutter, supports disposed at intervals about the cutter and adapted to support a plurality of blanks simultaneously in position for cutting, said cutter having a diameter larger than that of the blanks to adapt it for coöperation with all of said blanks, feeding means for effecting relative feeding movements of the blank supports and cutter substantially radially of the latter, and means for indexing the blank supports between feeding movements.

6. In a gear cutting machine, the combination of a rotary cutter provided with a plurality of tools spaced about its periphery, blank supports disposed in spaced relation about the cutter, said cutter having a diameter larger than that of the blanks to adapt it for coöperation with all of said supports and said tools and supports being spaced and arranged for beginning the cutting strokes of the tools one at a time, feeding means for effecting relative movements of the cutter and supports, and indexing mechanism for indexing the supports between feeding movements.

7. In a gear cutting machine, the combination of a rotary cutter having a plurality of tools, spaced about its periphery, a plurality of blank supports disposed about the cutter at intervals adapted for beginning the cutting strokes of the tools one at a time, feeding means for moving the blank supports independently of each other with respect to time, and means for indexing the supports between feeding movements.

8. In a gear cutting machine, the combination of a rotary cutter having a plurality of tools, spaced about its periphery, a plurality of blank supports disposed about the cutter at intervals adapted for beginning the cutting strokes of the tools one at a time, feeding means for moving the blank supports independently of each other with respect to time, means for indexing the supports between feeding movements, and tripping devices for discontinuing the feeding and indexing movements upon completion of the gears.

9. In a gear cutting machine, the combination of a rotary cutter, rotatable blank spindles disposed at intervals about the cutter for presenting a plurality of blanks thereto, feeding means for moving the spindles toward and from the cutter substantially radially of the latter, indexing means for rotating the spindles between feeding movements, and tripping means for discontinuing the feeding and indexing movements upon completion of the gears.

10. In a gear cutting machine, the combination of a rotary shaft and a cutter thereon, a plurality of blank supporting spindles disposed at intervals about the shaft for coöperation with the cutter, feeding means for moving the spindles toward and from the cutter, indexing means for rotating the spindles between feeding movements, actuating means for rotating the shaft and cutter, and gearing connecting the shaft with the feeding and indexing means for actuating the latter.

11. In a gear cutting machine, the combination of a rotary shaft and cutter thereon, a plurality of blank supporting spindles disposed at intervals about the shaft for coöperation with the cutter, feeding means for moving the spindles toward and from the cutter, indexing means for rotating the spindles between feeding movements, means for rotating the shaft and cutter, and operating means for said feeding and indexing means actuated by said shaft, comprising a clutch for starting and stopping the feeding and indexing movements of each spindle.

12. In a gear cutting machine, the combination of a rotary shaft and a cutter thereon, a plurality of blank supporting spindles disposed at intervals about the shaft for coöperation with the cutter, feeding means for moving the spindles toward and from the cutter, indexing means for rotating the spindles between feeding movements, means for rotating the shaft and cutter, and operating means for said feeding and indexing means for each spindle connected by a clutch with said shaft for actuation thereby, comprising automatic means for disengaging the clutch upon completion of a gear.

13. In a gear cutting machine, the combination of a rotary shaft and a cutter thereon, a plurality of blank supporting spindles disposed at intervals about the shaft for coöperation with the cutter, feeding means for moving the spindles toward and from the cutter, indexing means for rotating the spindles between feeding movements, means for rotating the shaft and cutter, and an actuating connection between said shaft and each spindle comprising a manually operable clutch and an adjustable tripping device for automatically disengaging the clutch upon completion of a gear.

14. In a gear cutting machine, a rotating cutter, a blank spindle, said cutter and spindle having a relative feeding movement, indexing means for said spindle, actuating means for effecting the feeding and indexing movements, a manually operable clutch for connecting and disconnecting said actuating means and a tripping mechanism for automatically operating said clutch and disconnecting said actuating means comprising a pawl and ratchet mechanism having a variably timed operation adjustable in accordance with the number of teeth to be cut.

15. In a gear cutting machine, a rotating cutter, a blank spindle, said cutter and spindle having a relative feeding movement, indexing means for said spindle, actuating means for effecting the feeding and indexing movements, a clutch shiftable to connect and disconnect said actuating means, a trip for automatically shifting said clutch to disconnect said acutating means, a spring for normally holding said trip in operative position, manually operated means for controlling said clutch and moving said trip to inoperative position, and mechanism for holding said trip in inoperative position and releasing the latter at variably timed intervals adjustable in accordance with the number of teeth to be cut.

16. In a gear cutting machine, a rotating cutter, a blank spindle, said cutter and spindle having a relative feeding movement, indexing means for said spindle, actuating means for effecting the feeding and indexing movements, a device for connecting and disconnecting said actuating means, a trip for automatically operating said device and disconnecting said actuating means including means normally urging said trip to operative position, retaining means holding said trip in inoperative position, a pawl and ratchet, an adjustable stop for the ratchet, and connections between said ratchet and retaining means for actuating the latter to release said trip.

17. In a gear cutting machine, a rotating cutter, a blank spindle, said cutter and spindle having a relative feeding movement, indexing means for said spindle, actuating means for effecting the feeding and indexing movements, comprising a clutch for disconnecting said actuating means, automatic mechanism for shifting said clutch, retaining means for rendering said mechanism inoperative, and a stop mechanism adjustable in accordance with the number of teeth to be cut for releasing said retaining means and disconnecting said actuating means upon completion of a gear.

18. In a gear cutting machine, a support, a rotary cutter thereon, guideways on said support, a carriage for a blank spindle movably carried on said guideways, means detachably connected with said carriage for automatically moving the latter to effect a feeding movement of the spindle toward and from the cutter, manually operated means for moving the carriage independently of said automatic means, and coöperating parts on the latter and said carriage for returning the carriage to an adjusted position relative to said automatic means after movement thereof by said manually operated means.

19. In a gear cutting machine, a support, a rotary cutter thereon, guideways on said support, a carriage for a blank spindle movably carried on said guideways, means detachably connected with said carriage for automatically moving the latter to effect a feeding movement of the spindle toward and from the cutter, manually operated means for moving the carriage independently of said automatic means, and coöperating parts on the latter and said carriage comprising a set screw and stop for returning the carriage to an adjusted position relative to said automatic means after movement thereof by said manually operated means.

20. In a gear cutting machine, a support, a rotary cutter thereon, guideways on said support extending in a direction substantially radial of the cutter, a carriage movably carried on said guideways, means detachably connected with the carriage for effecting an automatic feeding movement thereof, manually operated means for moving the carriage independently of said automatic means, guideways on said carriage extending transversely of the guideways on the support, a head movable on said carriage guideways and carrying a rotary blank spindle, and indexing means on the support and carriage and flexibly connected with said head for rotating the spindle and indexing the blank.

21. In a gear cutting machine, the combination of a rotary cutter, a plurality of blank supports disposed at intervals about the cutter, said supports and cutter being adapted and arranged for the coöperation of all of said blanks with the cutter, adjusting means for said supports to adapt them to accommodate blanks of different dimensions, feeding means for effecting relative movements of the supports and cutter substantially radially of the latter, and means for indexing the blanks between feeding movements.

22. In a gear cutting machine, the combination of a rotary cutter, a plurality of blank supports disposed at intervals about the cutter, said supports and cutter being adapted and arranged for the coöperation of all of said blanks with the cutter, adjusting means for said supports to adapt them to accommodate blanks of different dimensions, feeding means for effecting relative movements of the supports and cutter substantially radially of the latter, means for indexing the blanks between feeding movements, and variable actuating mechanism for said feeding and indexing means for actuating the latter at different rates of speed with relation to the rotary speed of the cutter.

JAMES E. GLEASON.
ARTHUR L. STEWART.
ERNEST C. HEAD.